(12) United States Patent
Muroya et al.

(10) Patent No.: US 11,688,535 B2
(45) Date of Patent: Jun. 27, 2023

(54) FERRITE SINTERED MAGNET, FERRITE PARTICLE, BONDED MAGNET AND ROTATING ELECTRIC MACHINE

(71) Applicant: TDK Corporation, Tokyo (JP)

(72) Inventors: Shogo Muroya, Tokyo (JP); Yoshitaka Murakawa, Tokyo (JP); Hiroyuki Morita, Tokyo (JP); Masanori Ikeda, Tokyo (JP)

(73) Assignee: TDK Corporation, Tokyo (JP)

( * ) Notice: Subject to any disclaimer, the term of this patent is extended or adjusted under 35 U.S.C. 154(b) by 485 days.

(21) Appl. No.: 16/825,290

(22) Filed: Mar. 20, 2020

(65) Prior Publication Data

US 2020/0312497 A1 Oct. 1, 2020

(30) Foreign Application Priority Data

Mar. 27, 2019 (JP) .................................. 2019-059934

(51) Int. Cl.
*H01F 1/113* (2006.01)
*H01F 1/10* (2006.01)
(Continued)

(52) U.S. Cl.
CPC .......... *H01F 1/113* (2013.01); *C04B 35/2608* (2013.01); *C04B 2235/3241* (2013.01);
(Continued)

(58) Field of Classification Search
CPC . H01F 1/10; H01F 1/0315; H01F 1/11; C04B 35/2633; C04B 35/2641;
(Continued)

(56) References Cited

U.S. PATENT DOCUMENTS 6,248,253 B1 * 6/2001 Taguchi ................... H01F 1/10
252/62.63
2009/0218540 A1 9/2009 Takami et al.
(Continued)

FOREIGN PATENT DOCUMENTS

CN 106977191 A 7/2017
JP 2001-110618 A 4/2001
(Continued)

OTHER PUBLICATIONS

1610/KOLNP/2012 published Jan. 25, 2013.
Indian Office Action issued in Indian Patent Application No. 202044000611 dated Jul. 29, 2021.

*Primary Examiner* — Matthew E. Hoban
*Assistant Examiner* — Lynne Edmondson
(74) *Attorney, Agent, or Firm* — Faegre Drinker Biddle & Reath LLP (57) ABSTRACT

This ferrite sintered magnet comprises ferrite phases having a magnetoplumbite type crystal structure. This magnet comprises an element R, an element M, Fe, Co, B, Mn and Cr, the element R is at least one element selected from rare earth elements including Y, the element M is at least one element selected from the group consisting of Ca, Sr and Ba, with Ca being an essential element, and when an atomic composition of metallic elements is represented by $R_{1-x}M_xFe_{m-y}Co_y$, x, y and m satisfy formulae:

$0.2 \leq x \leq 0.8$ (1)

$0.1 \leq y \leq 0.65$ (2)

$3 \leq m < 14$ (3).

Additionally, a content of B is 0.1 to 0.4% by mass in terms of $B_2O_3$, a content of Mn is 0.15 to 1.02% by mass in terms of MnO, and a content of Cr is 0.02 to 2.01% by mass in terms of $Cr_2O_3$.

7 Claims, 2 Drawing Sheets

(51) Int. Cl.
    *H01F 1/03*          (2006.01)
    *C04B 35/26*        (2006.01)
    *C01G 49/00*        (2006.01)

(52) U.S. Cl.
    CPC ................. *C04B 2235/3262* (2013.01); *C04B 2235/3409* (2013.01)

(58) Field of Classification Search
    CPC .......... C04B 35/62685; C04B 35/6281; C04B 35/2675; C04B 2235/3274; C04B 2235/767; C04B 2235/3208; C04B 2235/3213; C04B 2235/3217; C04B 2235/3227; C04B 2235/3277; C04B 2235/3409; C04B 2235/3418; C01G 49/0036; C01G 49/0054; C01P 2002/52; C01P 2004/84
    See application file for complete search history.

(56) References Cited

U.S. PATENT DOCUMENTS

2017/0207012 A1    7/2017   Morita
2019/0318856 A1   10/2019  Nagaoka et al.

FOREIGN PATENT DOCUMENTS

| JP | 2009-001476 A | 1/2009 |
|----|---------------|--------|
| WO | WO-2018/117261 A1 | 6/2018 |

* cited by examiner

FERRITE SINTERED MAGNET, FERRITE PARTICLE, BONDED MAGNET AND ROTATING ELECTRIC MACHINE

TECHNICAL FIELD

The present disclosure relates to a ferrite sintered magnet, ferrite particles, a bonded magnet and a rotating electric machine.

BACKGROUND

Ba ferrite, Sr ferrite and Ca ferrite having a hexagonal crystal structure are known as magnetic materials used for ferrite sintered magnets. A magnetoplumbite type (M type), a W type and the like are known as such ferrite crystal structures. Among these, a magnetoplumbite type (M type) ferrite is mainly adopted as magnet materials for motors or the like. The M type ferrite is usually represented by the formula $AFe_{12}O_{19}$.

As indices of magnetic properties of ferrite sintered magnets, residual magnetic flux density (Br) and coercive force (HcJ) are generally used. Until now, from the viewpoint of improving the Br and the HcJ, it has been attempted to add various elements which are different from the constituent elements of ferrite. For example, in Patent Literature 1, it has been attempted to improve magnetic properties by replacing some elements at A sites with Ca and a rare earth element (R), and replacing some elements at B sites with Co.

CITATION LIST

[Patent Literature 1] International Publication No. WO 2018/117261

SUMMARY

However, the firing temperature dependence of magnetic properties has not been particularly examined in conventional technology. To suppress variation in magnetic properties of magnets, it is desired that the firing temperature dependence is low.

Then, an object of the present invention is to provide ferrite particles and a ferrite sintered magnet wherein the firing temperature dependence of magnetic properties is low, and products using the same.

In one aspect, the present invention provides a ferrite sintered magnet comprising ferrite phases having a magnetoplumbite type crystal structure,
wherein the ferrite sintered magnet comprises an element R, an element M, Fe, Co, B, Mn and Cr,
the element R is at least one element selected from rare earth elements including Y,
the element M is at least one element selected from the group consisting of Ca, Sr and Ba, with Ca being an essential element,
when an atomic composition of metallic elements is represented by $R_{1-x}M_xFe_{m-y}Co_y$,
x, y and m satisfy formulae (1), (2) and (3):

$$0.2 \leq x \leq 0.8 \tag{1}$$

$$0.1 \leq y \leq 0.65 \tag{2}$$

$$3 \leq m < 14 \tag{3},$$

a content of B is 0.1 to 0.4% by mass in terms of $B_2O_3$,
a content of Mn is 0.15 to 1.02% by mass in terms of MnO, and
a content of Cr is 0.02 to 2.01% by mass in terms of $Cr_2O_3$.

The above-mentioned ferrite sintered magnet has low firing temperature dependence of magnetic properties. Therefore, variation in magnetic properties in the ferrite sintered magnet can be reduced.

It is preferable that the above-mentioned ferrite sintered magnet satisfy expressions (4) and (5):

$$0.2 \leq x \leq 0.55 \tag{4}$$

$$7.5 < m < 14 \tag{5}.$$

In another aspect, the present invention provides ferrite particles comprising ferrite phases having a magnetoplumbite type crystal structure,
wherein the ferrite particles comprise an element R, an element M, Fe, Co, B, Mn and Cr,
the element R is at least one element selected from rare earth elements including Y,
the element M is at least one element selected from the group consisting of Ca, Sr and Ba, with Ca being an essential element,
when an atomic composition of metallic elements is represented by $R_{1-x}M_xFe_{m-y}Co_y$,
x, y and m satisfy formulae (1), (2) and (3):

$$0.2 \leq x \leq 0.8 \tag{1}$$

$$0.1 \leq y \leq 0.65 \tag{2}$$

$$3 \leq m < 14 \tag{3},$$

a content of B is 0.1 to 0.4% by mass in terms of $B_2O_3$,
a content of Mn is 0.15 to 1.02% by mass in terms of MnO, and
a content of Cr is 0.02 to 2.01% by mass in terms of $Cr_2O_3$.

The above-mentioned ferrite particles has low firing temperature dependence of magnetic properties. Therefore, variation in magnetic properties in the magnet using this ferrite particles can be reduced.

It is preferable that the above-mentioned ferrite particles satisfy expressions (4) and (5):

$$0.2 \leq x < 0.55 \tag{4}$$

$$7.5 < m < 14 \tag{5}.$$

In yet another aspect, the present invention provides a bonded magnet comprising the above-mentioned ferrite particles.

In yet another aspect, the present invention provides a rotating electric machine comprising the above-mentioned ferrite sintered magnet or the above-mentioned bonded magnet.

According to the present invention, ferrite particles and a ferrite sintered magnet wherein the firing temperature dependence of magnetic properties is low, and products using the same are provided.

DETAILED DESCRIPTION

Some embodiments of the present invention are described in detail below.

A ferrite sintered magnet and ferrite particles according to an embodiment of the present invention contain an element R, an element M, Fe, Co, B, Mn and Cr.

The element R is at least one element selected from rare earth elements including Y.

The element M is at least one element selected from the group consisting of Ca, Sr and Ba, and Ca is an essential element in the element M.

When the atomic composition of the metallic elements in a ferrite sintered magnet and ferrite particles is represented by $R_xM_xFe_{m-y}Co_y$ (hereinafter occasionally referred to as formula (I)), x, y and m satisfy formulae (1), (2) and (3):

$$0.2 \leq x \leq 0.8 \quad (1)$$

$$0.1 \leq y \leq 0.65 \quad (2)$$

$$3 \leq m < 14 \quad (3).$$

The content of B in the ferrite sintered magnet and the ferrite particles is 0.1 to 0.4% by mass in terms of $B_2O_3$, the content of Mn is 0.15 to 1.02% by mass in terms of MnO, and the content of Cr is 0.02 to 2.01% by mass in terms of $Cr_2O_3$.

From the viewpoint of increasing the coercive force, x in formula (I) may be 0.7 or less, or may be 0.6 or less. From the same viewpoint, the x may be 0.25 or more, or may be 0.3 or more. From the same viewpoint, the x may be less than 0.55, or may be 0.5 or less.

From the viewpoint of further increasing magnetic properties, y in formula (I) may be 0.6 or less, or may be 0.5 or less. From the same viewpoint, the y in formula (I) may be 0.15 or more, or may be 0.2 or more.

From the viewpoint of further increasing the coercive force, m in formula (I) may be 4 or more, or may be 5 or more. From the same viewpoint, the m in formula (I) may be 13 or less, or may be 12 or less. From the same viewpoint, it is preferable that the m in formula (I) is more than 7.5, and it is more preferable that the m is 8 or more. From the viewpoint of further increasing the coercive force, the m in formula (I) may be 8 to 13, or may be 8 to 12.

It is preferable that the above-mentioned ferrite sintered magnet or the particles satisfy expressions (4) and (5).

$$0.2 \leq x < 0.55 \quad (4)$$

$$7.5 < m < 14 \quad (5).$$

A ferrite sintered magnet which is still more excellent in coercive force can be formed by satisfying the above-mentioned expressions (4) and (5).

Although a ferrite sintered magnet or particles have Ca as an essential component, Sr and Ba are optional components. Specifically, Ca may be contained, and Sr or Ba may not be contained; Ca and Sr may be contained, and Ba may not be contained; Ca and Ba may be contained, and Sr may not be contained; or Ca, Sr and Ba may be contained.

Formula (I) may be represented by formula (II) in some embodiments. x in formula (I) is equal to x1+x2 in formula (II). Therefore, the described contents as to the range of the x are applied also to the range of the x1+x2. In formula (II), R represents at least one element selected from rare earth elements including Y, and E represents at least one element selected from the group consisting of Sr and Ba.

$$R_{1-x1-x2}Ca_{x1}E_{x2}Fe_{m-y}Co_y \quad (II)$$

The composition of the ferrite sintered magnet or the particles satisfies formulae (6), (7), (8) and (9) when the composition is represented by formula (II). x1, x2, y and m in formula (II) represents a molar ratio. That is, when the composition of the ferrite sintered magnet is represented by formula (I), the composition may satisfy expression (1); and when the composition is represented by formula (II), the composition may satisfy expressions (6), (7), (8) and (9).

$$0.1 \leq x1 \leq 0.80 \quad (6)$$

$$0 \leq x2 < 0.5 \quad (7)$$

$$0.1 \leq y \leq 0.65 \quad (8)$$

$$3 \leq m < 14 \quad (9)$$

From the viewpoint of further increasing the coercive force, the x1 in formula (II) may be 0.7 or less, or may be 0.6 or less. From the same viewpoint, the x1 may be 0.20 or more, or may be 0.3 or more. From the viewpoint of further increasing the coercive force, the x2 in formula (II) may be 0.4 or less, or may be 0.3 or less. The x2 in formula (II) may be 0.

From the viewpoint of further increasing magnetic properties, the y in formula (II) may be 0.6 or less, or may be 0.5 or less. From the same viewpoint, the y in formula (II) may be 0.15 or more, or may be 0.2 or more. From the viewpoint of further increasing the coercive force, the m in formula (II) may be 4 or more, or may be 5 or more. From the same viewpoint, the m in formula (II) may be 13 or less, or may be 12 or less. From the same viewpoint, it is preferable that the m in formula (II) be more than 7.5, and it is more preferable that the m be 8 or more. From the viewpoint of further increasing the coercive force, the m in formula (II) may be 8 to 13, or may be 8 to 12.

It is preferable that the above-mentioned ferrite sintered magnet satisfies expressions (10) and (11).

$$0.2 \leq x1+x2 < 0.55 \quad (10)$$

$$7.5 < m < 14 \quad (11)$$

A ferrite sintered magnet which is still more excellent in coercive force is formed by satisfying the above-mentioned formulae (10) and (11).

The ratio of the contents of elements in the magnet can be measured by X-ray fluorescence analysis. The ratio of the contents of the elements is usually the same as the blended ratio of raw materials in the below-mentioned blending step. The content of B (boron) can be measured by inductively coupled plasma-atomic emission spectroscopy (ICP emission spectroscopy).

As mentioned above, although the content of B in the ferrite sintered magnet and the ferrite particles is 0.1 to 0.4% by mass in twits of $B_2O_3$, the above-mentioned content of B may be 0.35% by mass or less, or may be 0.3% by mass or less from the viewpoint of further increasing magnetic properties (coercive force and residual magnetic flux density). From the same viewpoint, the above-mentioned content of B may be 0.15% by mass or more, or may be 0.2% by mass or more.

Although the content of Mn in the ferrite sintered magnet and the ferrite particles is 0.15 to 1.02% by mass in terms of MnO, the above-mentioned content of Mn may be 0.19% by mass or more, may be 0.2% by mass or more, or may be 0.3% by mass or more from the viewpoint of further reducing the firing temperature dependence of magnetic properties. From the same viewpoint, the above-mentioned content of Mn may be 1.0% by mass or less, may be 0.9% by mass or less, or may be 0.8% by mass or less.

The content of Cr in the ferrite sintered magnet and the ferrite particles is 0.02 to 2.01% by mass in terms of $Cr_2O_3$. The above-mentioned content of Cr may be 0.06% by mass or more from the viewpoint of further reducing the firing temperature dependence of magnetic properties. From the same viewpoint, the above-mentioned content of Cr may be 1.5% by mass or less, may be 1.1% by mass or less, or may be 0.5% by mass or less.

The rare earth element of R in formula (I) and formula (II) is at least one selected from the group consisting of yttrium (Y), scandium (Sc), lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb) and lutetium (Lu).

It is preferable that R contain one or more elements selected from the group consisting of La (lanthanum), Ce (cerium), Pr (praseodymium), Nd (neodymium), and Sm (samarium), and it is more preferable that R contain La. R may consist of only La.

The ferrite sintered magnet and the ferrite particles may contain an element not represented in formula (I) or (II) as a subcomponent. Examples of the subcomponent include Si and Na. These subcomponents are contained in the ferrite sintered magnet, for example, as respective oxides or a multiple oxide.

The content of Si in the ferrite sintered magnet and the ferrite particles may be, for example, 0 to 3% by mass with Si converted into $SiO_2$. From the viewpoint of further increasing magnetic properties, the content of Si in the ferrite sintered magnet and the ferrite particles may be less than 0.3% by mass with Si converted into $SiO_2$. From the same viewpoint, the total content of Si and B in the ferrite sintered magnet and the ferrite particles may be 0.1 to 0.8% by mass, may be 0.1 to 0.6% by mass, or may be 0.2 to 0.5% by mass with Si and B converted into $SiO_2$ and $B_2O_3$. The content of Si (silicon) can be measured by inductively coupled plasma-atomic emission spectroscopy (ICP atomic emission spectroscopy).

The content of Na in the ferrite sintered magnet and the ferrite particles may be, for example, 0 to 0.2% by mass, may be 0.01 to 0.15% by mass, or may be 0.02 to 0.1% by mass with Na converted into $Na_2O$.

Impurities contained in raw materials or inevitable components derived from manufacturing equipment may be contained in the ferrite sintered magnet and the ferrite particles besides the above-mentioned components. Examples of such components include Ti (titanium), Mo (molybdenum), V (vanadium) and Al (aluminum). These components may be contained in the ferrite sintered magnet and the ferrite particles as respective oxides or a multiple oxide. The contents of the above-mentioned subcomponent, impurities, and inevitable components can be measured by X-ray fluorescence analysis or ICP atomic emission spectroscopy. The subcomponents may segregate on grain boundaries between ferrite grains in the ferrite sintered magnet and constitute different phases.

Figure 1:
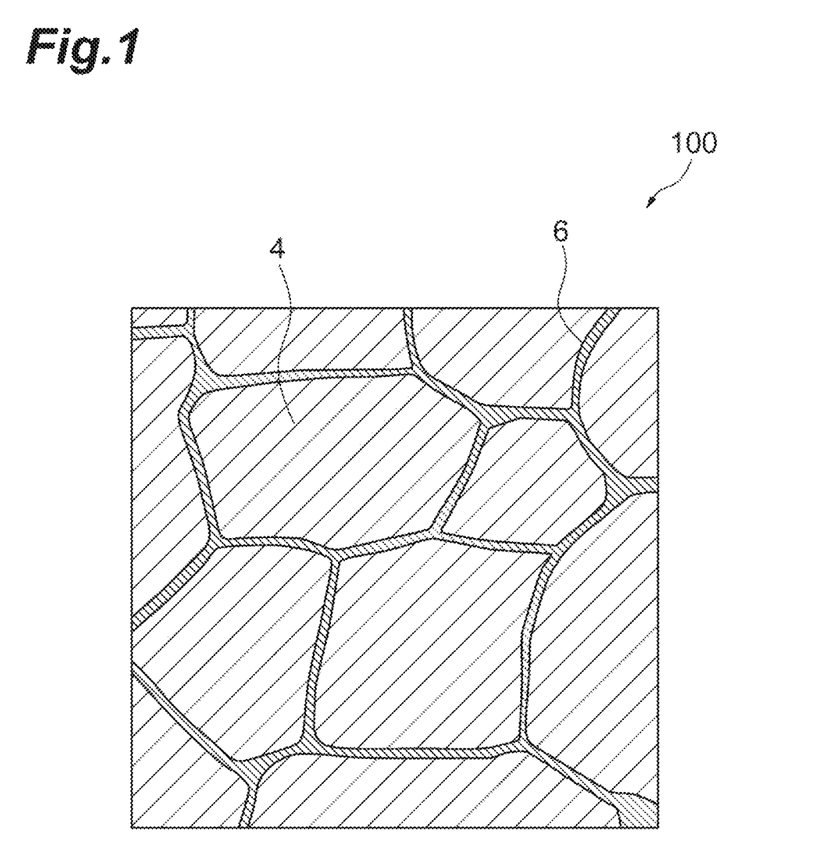
FIG. 1 is a schematic cross section of a ferrite sintered magnet or a ferrite particle.

FIG. 1 is a schematic cross section of a ferrite sintered magnet (ferrite particle) 100 according to an embodiment of the present invention. The ferrite sintered magnet (ferrite particle) 100 according to the embodiment of the present invention has ferrite phases (grains) 4 having a magnetoplumbite type (M type) crystal structure and a grain boundary phase 6 between ferrite phases (grains) 4 as shown in FIG. 1.

The M type ferrite has a hexagonal crystal structure, and an example of the M type ferrite is ferrite represented by formula (III).

$$MX_{12}O_{19} \qquad \text{(III)}$$

For M, Ca is an essential element and Sr and/or Ba may be contained. R may be contained for M. For X, Fe and Co are essential elements and Mn and/or Cr may be contained. Zn and/or Al may be further contained for X. R may be contained for X.

Since the ratios of M (A site) and X (B site) in formula (III) and the ratio of oxygen (O) actually deviates from the above-mentioned range slightly, the ratios may deviate from the above-mentioned numbers slightly.

It is preferable that the ferrite sintered magnet and the ferrite particles have the above-mentioned ferrite phases 4 as the main phase from the viewpoint of sufficiently increasing magnetic properties. "As the main phase" means being a crystal phase the mass ratio of which is the highest in the ferrite sintered magnet and the ferrite particles herein. The ferrite sintered magnet and the ferrite particles may have a different crystal phase from the main phase (different phase). The ratio of the main phase may be 70% by mass or more, may be 80% by mass or more, may be 90% by mass or more, or may be 95% by mass or more.

The average grain size of ferrite phases (grains) in the ferrite sintered magnet and the ferrite particles may be, for example, 5 or less, may be 4.0 µm or less, or may be 0.5 to 3.0 µm. The coercive force can be further increased by having such an average grain size. The average grain size of ferrite phases (grains) can be determined using an observation image of a section by TEM or SEM. In an observation image of SEM or TEM including hundreds of ferrite phases (grains), the grain size distribution is specifically measured by performing image processing. From the measured grain size distribution on the basis of numbers, the average value on the basis of the number of the grain sizes of ferrite phases (grains) is calculated. The average value measured thus is defined as the average grain size of ferrite phases.

A grain boundary phase 6 has an oxide as the main component. Specific examples of the oxide include an oxide having at least one selected from B (boron), Ca (calcium), Sr (strontium), Ba (barium), Si (silicon), Fe (iron), Mn (manganese), Cr (chromium), Zn (zinc) and Al (aluminum), and a multiple oxide of two or more of these. Examples of such an oxide include $SiO_2$, CaO, BaO, $Al_2O_3$, ZnO, $Fe_2O_3$, MnO, $Cr_2O_3$ and $B_2O_3$. Silicate glass may be contained. The mass ratio of the oxide can be 90% or more, can also be 95% or more, or can also be 97% or more.

In a section of the ferrite sintered magnet, the area percentage of grain boundary phase 6 with respect to the total of ferrite phases 4 and the grain boundary phase 6 can be 1 to 5%.

The shape of the ferrite sintered magnet is not particularly limited, and various shapes such as an arc segment shape (C-shape) in which the end face is curved so as to be arcuate and a plate shape can be taken.

Ferrite particles can be obtained, for example, by the below-mentioned pulverization step. The average grain size of the ferrite particles is, for example, 0.08 to 3.0 µm. The average particle size of the ferrite particles can also be determined in the same way as the average grain size of grains of the ferrite sintered magnet using an observation image of a section of the ferrite sintered magnet by TEM or SEM.

The coercive force of the ferrite sintered magnet and the ferrite particles at 20° C. can be, for example, preferably 420 kA/m or more. The residual magnetic flux density of the ferrite sintered magnet and the ferrite particles at 20° C. can be preferably 430 mT or more. It is preferable that the ferrite sintered magnet be excellent in both coercive force (HcJ) and residual magnetic flux density (Br).

(Bonded Magnet)

Next, an embodiment of a bonded magnet will be described hereinafter.

The bonded magnet of the present embodiment contains the above-mentioned ferrite particles and a resin. Examples of the resin include thermosetting resins such as epoxy resins, phenol resins, resins having a polyaromatic ring, and resins having a triazine ring (triazine resins); and thermoplastic resins such as styrene-based, olefin-based, urethane-based and polyester-based elastomers, polyamide-based elastomer such as nylons, ionomers, an ethylene-propylene copolymer (EPM), and an ethylene-ethyl acrylate copolymer.

From the viewpoint that the excellent magnetic properties and the excellent shape retention are compatible, the content of the resin in the bonded magnet may be, for example, 0.5 to 10% by mass, or may be 1 to 5% by mass. The content of the resin in the bonded magnet can be adjusted by changing the resin concentration in a solution containing the resin used at the time of manufacture and the molding pressure at the time of manufacturing a green compact. From the same viewpoint, the content of the ferrite particles in the bonded magnet may be, for example, 90 to 99.5% by mass, or may be 95 to 99% by mass.

The shape of the bonded magnet is not particularly limited, and can be the same as that of the ferrite sintered magnet.

(Rotating Electric Machine)

Figure 2:
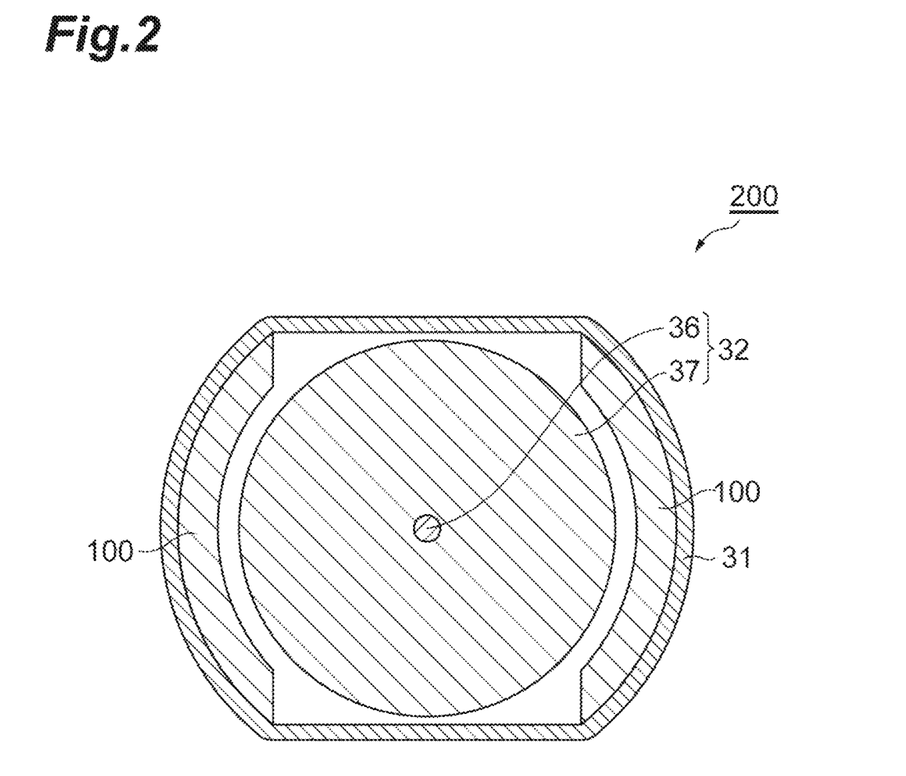
FIG. 2 is a schematic cross section showing one embodiment of a motor.

Then, a motor 200 according to one embodiment of the present invention is shown in FIG. 2. The motor 200 comprises a stator 31 and a rotor 32. The rotor 32 has a shaft 36 and a rotor core 37. In the motor 200 of the present embodiment, C-shaped ferrite sintered magnets or bonded magnets 100, which are permanent magnets, are provided in the stator 31, and the rotor core 37 of the rotor 32 is provided with an electromagnet (coil).

The motor may be a motor in which a ferrite sintered magnet is provided in the rotor, and electromagnets (coils) are provided in the stator. The form of the motor is not particularly limited. Another example of the rotating electric machine is a dynamo having a rotor and a stator. Ferrite sintered magnets can be provided in a rotor or a stator.

(Effect)

According to the present embodiment, while the coercive force and the residual magnetic flux density are maintained highly, the firing temperature dependence of the coercive force and the residual magnetic flux density is low. Therefore, it is easy to reduce variation in the obtained coercive force and residual magnetic flux density of the ferrite sintered magnet and the ferrite particles.

Specifically, even though the coercive force is 420 kA/m or more, and the residual magnetic flux density is 430 mT or more, and the firing temperature changes ±10° C. from 1180° C., a decrease in residual magnetic flux density can be 10 mT or less, and a decrease in coercive force can be 30 kA/m or less.

Although this reason is not clear, it is considered that one reason is because the ferrite sintered magnet contains Cr and Mn in addition to B in predetermined ranges, and the grain growth of ferrite is therefore suppressed by replacing Fe at B sites with Cr and Mn.

Such a ferrite sintered magnet and such a bonded magnet can be used as magnetic field generating members of rotating electric machines such as motors and dynamos; magnets for speakers and headphones; magnetron tubes; magnetic field generators for MRI; clampers for CD-ROM; sensors for distributors, sensors for ABS; fuel and oil level sensors; magnet latches; isolators; or the like. The ferrite sintered magnet and the bonded magnet can be used as targets (pellets) at the time of forming a magnetic layer of a magnetic recording medium by vapor-depositing or sputtering.

(Manufacturing Method)

Next, one example of a method for manufacturing ferrite particles, a ferrite sintered magnet and a bonded magnet will be described. The manufacturing method described hereinafter comprises a blending step, a calcination step, a pulverization step, a molding step and a firing step. Details of steps will be described hereinafter.

The blending step is a step of preparing a mixed powder for calcination. The mixed powder for calcination can contain the constituent elements of ferrite, for example, Fe, M, R and Co. In the blending step, the mixture of powders containing elements is suitably mixed and pulverized by an attritor or a ball mill for around 1 to 20 hours to obtain the mixed powder.

Although additional elements such as B, Mn and Cr may be beforehand contained in the above-mentioned powder, other powders containing the additional elements may be further added to obtain the mixed powder for calcination in the blending step. Examples of the other powders include a powder containing B, a powder containing Mn and a powder containing Cr.

Examples of the powders containing the elements include the simple substances, oxides, hydroxides, carbonates, nitrates, silicates and organic metallic compounds of the elements. One powder may contain two or more metallic elements, and one powder may contain only one metallic element substantially.

Examples of a powder containing Fe include $Fe_2O_3$. Examples of a powder containing Co include CoO and $Co_3O_4$. Examples of a powder containing Ca include $CaCO_3$ and CaO. Examples of a powder containing Sr include $SrCO_3$ and SrO. Examples of a powder containing R include $La(OH)_3$. Examples of a powder containing B include $B_2O_3$ and $H_3BO_3$. Examples of a powder containing Mn include MnO. Examples of a powder containing Cr include $Cr_2O_3$.

The average particle size of the raw material powders is not particularly limited, and is, for example, 0.1 to 2.0 μm.

Although the composition of the metallic and semimetallic elements in the mixed powder approximately agrees with the composition of the end products of the ferrite sintered magnet, there are elements which disappear in the manufacturing process, and therefore the compositions may not correctly agree.

In the calcination step, the raw material composition obtained in the blending step is calcined. It is preferable to perform calcination in an oxidizing atmosphere such as the air atmosphere. The calcination temperature may be, for example, 1100 to 1400° C., or may be 1100 to 1300° C. The calcination time may be, for example, 1 second to 10 hours, or may be 1 second to 3 hours. The ratio of ferrite phases (M phases) in the calcined powder (ferrite particles) obtained by calcination may be, for example, 70% by volume or more, or may be 75% by volume or more. This ratio of the ferrite phases can be determined in the same way as the ratio of a ferrite phase in the ferrite sintered magnet.

In the pulverization step, the calcined powder which becomes granular or massive by the calcination step is pulverized. Ferrite particles are thus obtained. For example, the pulverization step may be divided into two steps of pulverizing the calcined powder into a coarse powder (coarse pulverization step), and then pulverizing this still finer (fine pulverization step).

The coarse pulverization can be performed, for example, using a vibrating mill or the like until the average particle size of the calcined powder is 0.5 to 5.0 μm. In the fine pulverization, the coarse powder obtained by the coarse pulverization is further pulverized by a wet attritor, a ball mill, a jet mill or the like. In the fine pulverization, pulverization is performed so that the average particle size of the obtained fine powder (ferrite particles) is, for example, around 0.08 to 3.0 μm. The specific surface area of the fine powder (determined, for example, by the BET method) is, for example, around 7 to 12 m$^2$/g. Suitable pulverizing time varies according to the pulverization method, and is, for example, 30 minutes to 10 hours in the case of a wet attritor and 10 to 50 hours in wet pulverization by a ball mill. The specific surface area of the ferrite particles can be measured using a commercial BET surface area measuring instrument (manufactured by MOUNTECH Co., Ltd., trade name: HM Model-1210).

In the fine pulverization step, for example, a polyhydric alcohol represented by the formula $C_n(OH)_nH_{n+2}$ may be added to increase the magnetic orientation degree of the sintered body obtained after firing. n in the formula may be, for example, 4 to 100, or may be 4 to 30. Examples of the polyhydric alcohol include sorbitol. Two or more polyhydric alcohols may be used in combination. In addition to the polyhydric alcohol, other well-known dispersants may be further used in combination.

When the polyhydric alcohol is added, the amount thereof added may be 0.05 to 5.0% by mass, or may be 0.1 to 3.0% by mass on the basis of an object to which it is added (for example, the coarse powder). The polyhydric alcohol added in the fine pulverization step is removed by thermal decomposition in the below-mentioned firing step.

In the coarse pulverization step and/or the fine pulverization step, powders such as $SiO_2$ may be added as subcomponents. The sinterability can be improved, and magnetic properties can be improved by adding such a subcomponent. However, it is preferable that the amount of $SiO_2$ added be not surplus from the viewpoint of increasing magnetic properties fully. Since these subcomponents may flow out with the solvent of slurry at the time of a wet type molding, it is preferable that the subcomponents be blended in larger amounts than the target content in the ferrite sintered magnet 100.

In the molding step, the ferrite particles obtained in the pulverization step are molded in a magnetic field to obtain a green compact. Molding can be performed by either method of dry molding and wet molding. It is preferable to perform wet molding from the viewpoint of increasing the degree of magnetic orientation.

When molding is performed by wet molding, for example, slurry is obtained by performing the above-mentioned fine pulverization step by a wet process, this slurry is then concentrated to a predetermined concentration to obtain slurry for wet molding. Molding can be performed using this slurry for wet molding. The concentration of slurry can be performed by centrifugal separation, a filter press or the like. The content of the ferrite particles in the slurry for wet molding is, for example, 30 to 80% by mass. Examples of the dispersion medium dispersing the ferrite particles in slurry include water. A surfactant such as gluconic acid, gluconate or sorbitol may be added to the slurry. A nonaqueous solvent may be used as the dispersion medium. As the nonaqueous solvent, organic solvent such as toluene and xylene can be used. In this case, a surfactant such as oleic acid may be added. The slurry for wet molding may be prepared by adding a dispersion medium and the like to the dry ferrite particles after fine pulverization.

In the wet molding, this slurry for wet molding is next molded in a magnetic field. In that case, the molding pressure is around 9.8 to 49 MPa (0.1 to 0.5 ton/cm$^2$). The magnetic field to apply is around 398 to 1194 kA/m (5 to 15 kOe).

In the firing step, the green compact obtained in the molding step is fired into a ferrite sintered magnet. The firing of the green compact can be performed in an oxidizing atmosphere such as the air atmosphere. The firing temperature may be, for example, 1050 to 1270° C., or may be 1080 to 1240° C. The firing time (time for which the temperature is maintained at the firing temperature) is for example, around 0.5 to 3 hours.

In the firing step, heating may be performed, for example, at a rate of temperature increase of around 0.5° C./minute from room temperature to around 100° C. before the temperature reaches the firing temperature. The green compact can be fully dried thereby before sintering proceeds. The surfactant added in the molding step can be fully removed. These treatments may be performed at the start of the firing step or before the firing step separately.

The ferrite sintered magnet can be thus manufactured. At the time of not manufacturing the ferrite sintered magnet but the bonded magnet, the bonded magnet can be obtained by impregnating the green compact obtained by the above-mentioned molding step with a resin, heating and curing the resin. The green compact is specifically immersed in a resin-containing solution prepared beforehand and the immersed green compact is defoamed by decompressing in an airtight container, and thereby the resin-containing solution permeates into the vacant spaces of the green compact. Then, the green compact is taken out of the resin-containing solution, and a surplus resin-content solution adhering to the surface of the green compact is removed. A centrifuge or the like may be used for removing the surplus resin-containing solution.

By placing the green compact in an airtight container and immersing the green compact in a solvent such as toluene while maintaining a decompressed atmosphere before immersion in the resin-containing solution, defoaming is promoted and the amount of the resin impregnated can be increased, thereby vacant spaces in the green compact can be reduced.

The method for manufacturing ferrite particles, a ferrite sintered magnet, and a bonded magnet is not limited to the above-mentioned example. For example, when the bonded magnet is manufactured, the procedure to the above-mentioned pulverization step is performed, the obtained ferrite particles and the resin may be then mixed, and this may be molded in a magnetic field, and a bonded magnet containing the ferrite particles and the resin may be obtained.

For example, the molding step and the firing step may be performed through the following procedure. That is, the molding step is performed by CIM (Ceramic Injection Molding) or PIM (Powder Injection Molding, a type of powder injection molding). In the CIM method, dried ferrite particles are first heated and kneaded with a binder resin to form a pellet. This pellet is subjected to injection molding in a metallic mold on which a magnetic field is impressed to obtain a preliminary green compact. A green compact is obtained by subjecting the preliminary green compact to debindering treatment. In the firing step, the green compact subjected to debindering treatment is then sintered, for example, in the air atmosphere at a temperature of preferably 1100 to 1250° C. and more preferably 1160 to 1230° C. for around 0.2 to 3 hours, and a ferrite sintered magnet can be obtained.

EXAMPLES

Although the contents of the present invention will be described still more specifically with reference to Examples and Comparative Example, the present invention is not limited to the following Examples.

[Manufacturing of Ferrite Sintered Magnet]

Manufacturing Examples 1 to 8 and Comparative Examples 1 to 6

Iron oxide ($Fe_2O_3$), calcium carbonate ($CaCO_3$), cobalt oxide ($Co_3O_4$), and lanthanum hydroxide ($La(OH)_3$) were provided as raw materials. These raw materials were blended so that the compositions of formulae (I) and (II) were as listed in Table 1. Boron oxide ($B_2O_3$) and manganese oxide (MnO) and chromic oxide ($Cr_2O_3$) were added in predetermined amounts to the thus obtained formulation, the mixture was mixed and pulverized for 10 minutes using a wet attritor to obtain slurry (blending step). In Examples and Comparative Examples, the blending ratios of the raw materials were changed as shown in Table 1 so that ferrite sintered magnets having mutually different compositions were obtained.

This slurry was dried, and calcination in which the dried product was maintained in the air atmosphere at 1300° C. for 2 hours was then performed to obtain a calcined powder (calcination step). The obtained calcined powder was coarsely pulverized for 10 minutes by a small rod vibrating mill to obtain a coarse powder. To this coarse powder was added 0.2% by mass silicon oxide ($SiO_2$). Then, fine pulverization was performed using a wet ball mill for 35 hours to obtain slurry containing ferrite particles (pulverization step).

The slurry obtained after fine pulverization was adjusted to a solid content concentration of 73 to 75%, and slurry for wet molding was prepared. This slurry for wet molding was molded using a wet magnetic field molding machine in an impressed magnetic field at 796 kA/m (10 kOe) to obtain green compacts having a cylindrical shape of 30 mm in diameter×15 mm in thickness (molding step). The obtained green compacts are dried in the air atmosphere at room temperature, firing in which the green compacts were maintained in the air atmosphere at 1170° C., 1180° C. and 1190° C. was then performed for 1 hour, respectively to obtain three cylindrical ferrite sintered magnets the firing temperatures of which were mutually different per each example (firing step).

[Evaluation 1 of Ferrite Sintered Magnet]
<Evaluation of Magnetic Properties>

The top and bottom surfaces of the ferrite sintered magnets were processed, and the magnetic properties at 20° C. were measured using a B-H tracer at a maximum impressed magnetic field of 29 kOe. The residual magnetic flux density [Br] and the coercive force [HcJ] were determined thereby. The Br and the HcJ of the magnet the firing temperature of which is 1180° C., and the differences in residual magnetic flux density ΔBr and coercive force ΔHcj between a magnet the properties of which are the worse of the magnets the firing temperatures of which are 1170° C. and 1190° C. and the magnet the firing temperature of which is 1180° C. are shown in Table 1.

<Composition Analysis>

The contents of B, Mn and Cr in the ferrite sintered magnet were measured in the following procedure. First, 0.1 g of a ferrite sintered magnet sample, 1 g of sodium peroxide and 1 g of sodium carbonate were mixed and heated to melt. The melt was dissolved in a solution of 40 ml of pure water and 10 ml of hydrochloric acid, and pure water was added to prepare 100 ml of a solution. The content of boron in terms of $B_2O_3$, the content of Mn in terms of MnO and the content of Cr in terms of $Cr_2O_3$ were determined by ICP atomic emission spectroscopy (ICP-AES) using this solution. An analyzing device manufactured by SHIMADZU CORPORATION (device name: ICPS 8100CL) was used for ICP atomic emission spectroscopy, and matrix matching was performed at the time of measurement.

The atomic ratios of Fe, Co, La, Ca and Sr were determined in the same way. These results are shown in Table 1.

TABLE 1

| | Atomic ratio | | | | | Amount added in ferrite sintered magnet | | | Magnetic properties Firing temperature 1180° C. | | Firing temperature dependence | |
|---|---|---|---|---|---|---|---|---|---|---|---|---|
| | m-y Fe | y Co | 1-x La | x1 Ca | x2 Sr | $B_2O_3$ mass % | MnO mass % | $Cr_2O_3$ mass % | Br mT | Hcj kA/m | ΔBr mT | ΔHcJ kA/m |
| Example 1 | 9.5 | 0.3 | 0.58 | 0.42 | 0 | 0.11 | 0.43 | 0.06 | 459.2 | 420.6 | 3.0 | 14.2 |
| Example 2 | 9.5 | 0.3 | 0.58 | 0.42 | 0 | 0.17 | 0.43 | 0.06 | 458.3 | 507.5 | 2.5 | 21.7 |
| Example 3 | 9.5 | 0.3 | 0.58 | 0.42 | 0 | 0.22 | 0.43 | 0.06 | 460.2 | 515.4 | 5.4 | 17.8 |
| Comparative Example 1 | 9.5 | 0.3 | 0.58 | 0.42 | 0 | 0.06 | 0.43 | 0.06 | 425.6 | 312.7 | 3.0 | 14.0 |
| Comparative Example 2 | 9.5 | 0.3 | 0.58 | 0.42 | 0 | 0.42 | 0.43 | 0.06 | 359.9 | 337.5 | 21.5 | 42.6 |
| Comparative Example 3 | 9.5 | 0.3 | 0.58 | 0.42 | 0 | 0.58 | 0.43 | 0.06 | 260.2 | 264.2 | 82.2 | 64.3 |
| Example 4 | 9.5 | 0.3 | 0.58 | 0.42 | 0 | 0.22 | 0.19 | 0.06 | 460.5 | 516.1 | 6.2 | 12.0 |
| Example 5 | 9.5 | 0.3 | 0.58 | 0.42 | 0 | 0.22 | 0.52 | 0.06 | 458.0 | 491.4 | 5.1 | 8.0 |
| Example 6 | 9.5 | 0.3 | 0.58 | 0.42 | 0 | 0.22 | 1.02 | 0.06 | 439.0 | 431.0 | 9.5 | 20.2 |
| Comparative Example 4 | 9.5 | 0.3 | 0.58 | 0.42 | 0 | 0.22 | 1.19 | 0.06 | 432.8 | 418.2 | 25.1 | 26.5 |
| Comparative Example 5 | 9.5 | 0.3 | 0.58 | 0.42 | 0 | 0.22 | 1.91 | 0.06 | 373.6 | 346.7 | 35.3 | 14.9 |
| Example 7 | 9.5 | 0.3 | 0.58 | 0.42 | 0 | 0.22 | 0.42 | 1.10 | 437.2 | 553.6 | 7.2 | 12.9 |
| Example 8 | 9.5 | 0.3 | 0.58 | 0.42 | 0 | 0.22 | 0.42 | 2.01 | 431.0 | 590.0 | 8.0 | 11.6 |

TABLE 1-continued

| | Atomic ratio | | | | | Amount added in ferrite sintered magnet | | | Magnetic properties | | | |
| | | | | | | | | | Firing temperature 1180° C. | | Firing temperature dependence | |
| | m-y Fe | y Co | 1-x La | x1 Ca | x2 Sr | B₂O₃ mass % | MnO mass % | Cr₂O₃ mass % | Br mT | Hcj kA/m | ΔBr mT | ΔHcJ kA/m |
|---|---|---|---|---|---|---|---|---|---|---|---|---|
| Comparative Example 6 | 9.5 | 0.3 | 0.58 | 0.42 | 0 | 0.22 | 0.43 | 2.12 | 428.6 | 593.9 | 8.4 | 11.4 |
| Comparative Example 7 | 9.5 | 0.3 | 0.58 | 0.42 | 0 | 0.22 | 0.01 | 0.01 | 460.7 | 518.1 | 13.1 | 18.8 |

As shown in Table 1, in Comparative Example 7 in which the content of Mn in terms of MnO was 0.01% by mass, and the content of Cr in terms of $Cr_2O_3$ was 0.01% by mass, although the Br and the Hcj were good, the ΔBr was high. Meanwhile, in Examples in which the contents of Mn and Cr were in a predetermined range, while the Br and the Hcj were good, the ΔBr and the ΔHcj were low.

The content of silicon in terms of $SiO_2$ in each Example was 0.2% by mass.

INDUSTRIAL APPLICABILITY

According to the present disclosure, ferrite particles and a ferrite sintered magnet wherein the firing temperature dependence of magnetic properties is low, and products using the same are provided.

REFERENCE SIGNS LIST

100: Ferrite sintered magnet or Bonded magnet, 200: Motor, 31: Stator, 32: Rotor.

What is claimed is:

1. A ferrite sintered magnet comprising ferrite phases having a magnetoplumbite type crystal structure,
    wherein the ferrite sintered magnet comprises an element R, an element M, Fe, Co, B, Mn and Cr,
    the element R is at least one element selected from rare earth elements including Y,
    the element M is at least one element selected from the group consisting of Ca, Sr and Ba, with Ca being an essential element,
    when an atomic composition of metallic elements is represented by $R_{1-x}M_xFe_{m-y}Co_y$, x, y and m satisfy formulae (1), (2) and (3):

$$0.2 \leq x \leq 0.8 \quad (1)$$

$$0.1 \leq y \leq 0.65 \quad (2)$$

$$3 \leq m < 14 \quad (3),$$

a content of B is 0.1 to 0.4% by mass in terms of $B_2O_3$,
    a content of Mn is 0.15 to 1.02% by mass in terms of MnO, and
    a content of Cr is 0.02 to 2.01% by mass in terms of $Cr_2O_3$.

2. The ferrite sintered magnet according to claim 1, wherein the ferrite sintered magnet satisfies formulae (4) and (5):

$$0.2 \leq x < 0.55 \quad (4)$$

$$7.5 < m < 14 \quad (5).$$

3. A rotating electric machine comprising the ferrite sintered magnet according to claim 1.

4. Ferrite particles comprising ferrite phases having a magnetoplumbite type crystal structure,
    wherein the ferrite particles comprise an element R, an element M, Fe, Co, B, Mn and Cr,
    the element R is at least one element selected from rare earth elements including Y,
    the element M is at least one element selected from the group consisting of Ca, Sr and Ba, with Ca being an essential element,
    when an atomic composition of metallic elements is represented by $R_{1-x}M_xFe_{m-y}Co_y$,
    x, y and m satisfy formulae (1), (2) and (3):

$$0.2 \leq x \leq 0.8 \quad (1)$$

$$0.1 \leq y \leq 0.65 \quad (2)$$

$$3 \leq m < 14 \quad (3),$$

a content of B is 0.1 to 0.4% by mass in terms of $B_2O_3$,
    a content of Mn is 0.15 to 1.02% by mass in terms of MnO, and
    a content of Cr is 0.02 to 2.01% by mass in terms of $Cr_2O_3$.

5. The ferrite particles according to claim 4, wherein the ferrite particles satisfy formulae (4) and (5):

$$0.2 \leq x < 0.55 \quad (4)$$

$$7.5 < m < 14 \quad (5).$$

6. A bonded magnet comprising ferrite particles, the ferrite particles comprising ferrite phases having a magnetoplumbite type crystal structure,
    wherein the ferrite particles comprise an element R, an element M, Fe, Co, B, Mn and Cr,
    the element R is at least one element selected from rare earth elements including Y,
    the element M is at least one element selected from the group consisting of Ca, Sr and Ba, with Ca being an essential element,
    when an atomic composition of metallic elements is represented by $R_{1-x}M_xFe_{m-y}Co_y$,
    x, y and m satisfy formulae (1), (2) and (3):

$$0.2 \leq x \leq 0.8 \quad (1)$$

$$0.1 \leq y \leq 0.65 \quad (2)$$

$$3 \leq m < 14 \quad (3),$$

a content of B is 0.1 to 0.4% by mass in terms of $B_2O_3$,
    a content of Mn is 0.15 to 1.02% by mass in terms of MnO, and a content of Cr is 0.02 to 2.01% by mass in terms of Cr$_2$O$_3$.

7. A rotating electric machine comprising the bonded magnet according to claim 6.

* * * * *